United States Patent
Fujita et al.

(10) Patent No.: US 6,365,029 B1
(45) Date of Patent: *Apr. 2, 2002

(54) MANUFACTURING METHOD FOR A THIN FILM MAGNETIC HEAD HAVING FINE CRYSTAL GRAIN COIL

(75) Inventors: Kiyoharu Fujita; Shinji Furuichi, both of Mohka; Takeo Sasaki, Kumagaya, all of (JP)

(73) Assignee: Hitachi Metals, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,585

(22) Filed: May 11, 1999

(30) Foreign Application Priority Data

Jun. 16, 1998 (JP) .............................. 10-167841

(51) Int. Cl.$^7$ .............................. C25D 5/02; C23C 28/02
(52) U.S. Cl. ........................................ 205/118; 205/186
(58) Field of Search ................................ 360/123, 125, 360/126; 29/603.01, 603.07, 603.23, 603.24, 603.25, 603.26; 257/762; 205/118, 119, 135, 186

(56) References Cited

U.S. PATENT DOCUMENTS

| 4,540,473 A | * | 9/1985 | Bindra et al. | 204/50 R |
|---|---|---|---|---|
| 5,547,557 A | * | 8/1996 | Asai et al. | 205/118 |
| 5,549,978 A | * | 8/1996 | Iwasaki et al. | 428/692 |
| 5,659,451 A | * | 8/1997 | Cohen et al. | 360/126 |
| 5,703,740 A | * | 12/1997 | Cohen et al. | 360/126 |
| 5,734,534 A | * | 3/1998 | Yamamoto | 360/123 |
| 5,856,898 A | * | 1/1999 | Ohashi | 360/123 |
| 5,917,244 A | * | 6/1999 | Lee et al. | 257/762 |
| 6,065,424 A | * | 5/2000 | Shacham-Diamand et al. | 118/696 |

FOREIGN PATENT DOCUMENTS

JP          6-44529    *   2/1994

* cited by examiner

*Primary Examiner*—Edna Wong

(57) ABSTRACT

A thin film magnetic head comprising a lower magnetic core, an upper magnetic core, and a thin film copper coil wound between magnetic poles of the lower and upper magnetic cores, the time constant of which can be reduced by reducing the specific resistance of the thin film coil and reducing insulating resin layers between the thin film coil conductors and between the coil layers, thereby allowing writing information at higher frequencies. The average crystal grain size of the thin film copper coil is made to be not more than 0.5 $\mu$m. More preferably, the average crystal grain size should be not more than 0.2 $\mu$m. In the thin film magnetic head, the surface roughness of the thin film copper coil can be reduced to not more than 15 nm.

10 Claims, 5 Drawing Sheets

MANUFACTURING METHOD FOR A THIN FILM MAGNETIC HEAD HAVING FINE CRYSTAL GRAIN COIL

BACKGROUND OF THE INVENTION

1. Field of the Invention

This invention relates generally to a thin film magnetic head used for recording and reproducing information in magnetic disk unit, and more particularly to a thin film magnetic head in which the crystal grain size of copper constituting at least one layer of thin film coil wound between a lower magnetic core and an upper magnetic core is made so fine that the electrical resistance thereof can be reduced, and thereby the distance of the thin film coil conductors can be reduced.

2. Description of the Related Art

Figure 1:
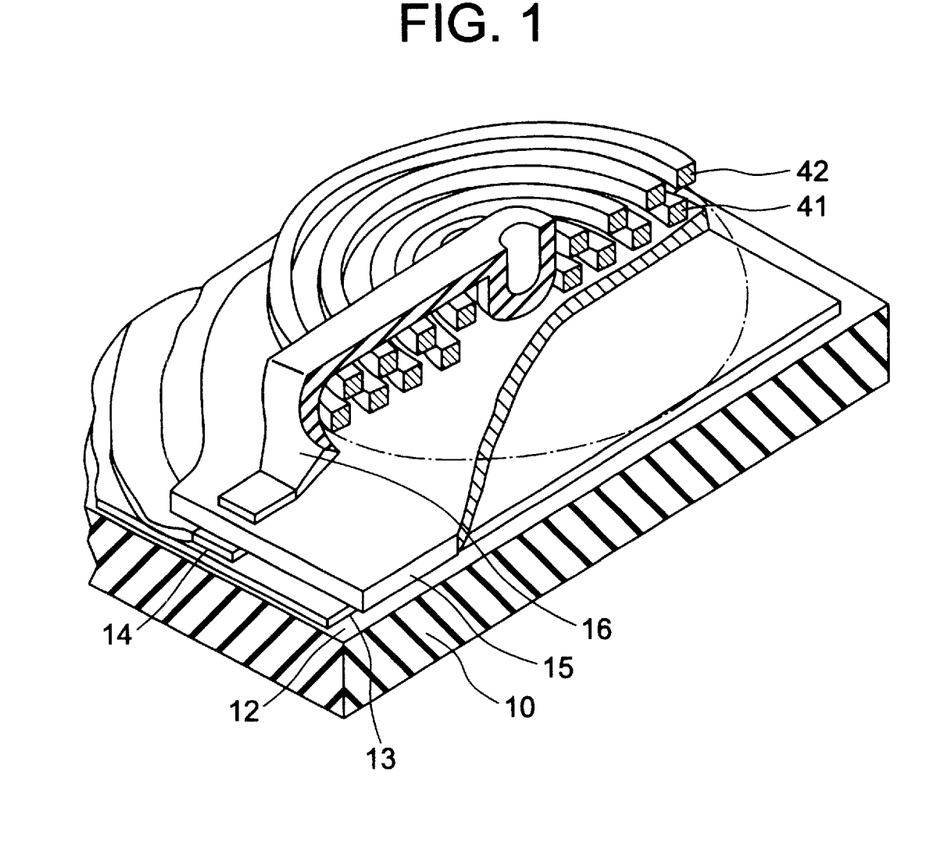
FIG. 1 is a partially cross-sectional perspective view of a thin film magnetic head embodying this invention.

The separate read/write magnetic head comprises a magneto-resistive head and an inductive head laminated on a non-magnetic substrate 10 made of alumina/titanium carbide, etc., as shown in a perspective view of FIG. 1. Since this invention relates to the construction of a thin film coil used in the inductive head, the term "thin film magnetic head" used in this Specification refers to a "separate read/write magnetic head," and/or the "inductive head" thereof. Since a vertical recording magnetic head has the substantially same structure as an in-plane recording magnetic head, the inductive recording head may include the vertical recording magnetic head having a return magnetic path, and the term "thin film magnetic head" may refer to the vertical recording magnetic head with a return magnetic path and/or a composite head of a magnetoresistive head and the vertical recording magnetic head.

In FIG. 1, the thin film magnetic head has an alumina layer 12, a lower shield 13, a magneto-resistive element 14, a magnetic film 15 serving as an upper shield and a lower magnetic core (hereinafter referred to as "lower magnetic core"), and an upper magnetic core 16 on a non-magnetic substrate 10. In the figure, insulating films for insulating among the lower shield, the magneto-resistive element and the upper shield are omitted. A non-magnetic film made of alumina, etc. is provided between the lower magnetic core and the upper magnetic core, and ends of both the magnetic films facing each other via the non-magnetic thin film serve as magnetic poles of the thin film magnetic head.

An exciting coil is wound between the lower magnetic core and the upper magnetic core. A thin film coil is used as the exciting coil, and the number of turns of this coil is about 15 turns to maintain electromagnetic conversion characteristics between the magnetic cores and the coil. In order to reduce the inductance of the head by reducing the space occupied by this coil between the upper and lower magnetic cores, a thin film coil is provided in multiple layers, more commonly in two layers. To ensure insulation between the coil conductors and between the coil and the magnetic cores, non-magnetic insulating layers are provided in such a manner to surround the coils.

If the thin film coil conductors and the non-magnetic insulating layers can be made smaller and thinner, the magnetic poles provided in such a manner as to surround the coil conductors can be made smaller. This would lead to a reduction in the size of the thin film magnetic head, and accordingly reduce the inductance of the head, making it possible to record information at higher frequencies. Reducing the cross-sectional area of the thin film coil, however, would inevitably increase the resistance. It is necessary, therefore, to avoid increasing the resistance.

A thin film coil for thin film magnetic heads is normally manufactured by copper plating. An electrically conductive film is formed by sputtering an electrically conductive material, such as copper, on a non-magnetic thin film, made of alumina, etc., and an insulating resin layer, both laminated on a lower magnetic core. A photoresist film is applied to the surface of the electrically conductive film and baked at a predetermined temperature. The photoresist film, on which a photomask is positioned, is then light-exposed, developed and rinsed with water. Thus, a photoresist pattern corresponding to the thin film coil pattern is formed. Next, the thin film coil is formed by plating using a plating solution, such as copper sulfate solution. Then, the photoresist film is dissolved, and the electrically conductive film between the thin film coil conductors is removed by ion milling to complete the thin film coil. A photoresist is packed on the thin film coil in such a manner as to enclose the coil conductors, and then the photoresist is heated and cured at about 270° C. to form an insulating resin film. Multiple layers of thin film coil are formed by repeating this process.

The thin film coil conductors thus formed are 2.5 to 4 $\mu$m in width and height, with intervals between coil conductors being 2 to 4 $\mu$m. Its average crystal grain size is as large as 1.1 to 1.5 $\mu$m. Although the specific resistance of copper in bulk state is as small as 1.724 $\mu$ohm-cm, that of the thin film coil conductors is as large as over 2 $\mu$ohm-cm because of the large crystal grain size of copper in the thin film coil conductors. Because of the large specific resistance of copper in the thin film coil, the cross-sectional area of the thin film coil has to be increased to reduce the resistance of the coil.

The large crystal grain size of copper in the thin film coil not only increases the surface roughness of the thin film coil, but also may cause copper crystals to grow during plating even breaking through the photoresist film. The plating film also tends to penetrate between the electrically conductive film and the photoresist, leading to layer short-circuiting. To prevent such short-circuiting, the thickness of the insulating resin layers between the thin film coil conductors and between the layers of the thin film coil has to be increased. This could result in an increase in the sizes of the upper and lower magnetic cores.

SUMMARY OF THE INVENTION

It is therefore an object of this invention to provide a thin film magnetic head in which the recording current can abruptly arise and information can be written at higher frequencies because the time constant of the thin film coil can be reduced by reducing the specific resistance of the thin film coil and reducing insulating resin layers between the thin film coil conductors and between the coil layers.

In the thin film magnetic head according to this invention comprising a lower magnetic core, an upper magnetic core, and a thin film coil copper wound between them, the average crystal grain size of the thin film copper coil is not more than 0.5 $\mu$m. More preferably, the average crystal grain size should be not more than 0.2 $\mu$m. In the thin film magnetic head of the invention, it is more preferable that the surface roughness of the thin film copper coil is not more than 15 nm.

DESCRIPTION OF THE PREFERRED EMBODIMENTS

Referring to the drawings, the embodiments of the thin film magnetic head according to the invention will be described in detail below.

Figure 2:
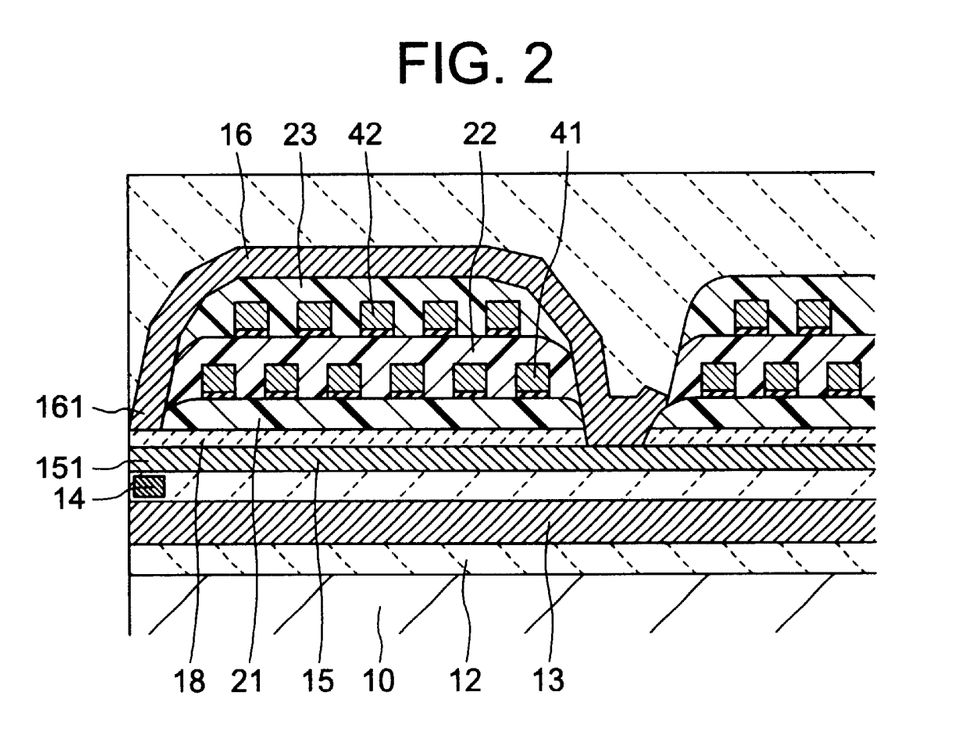
FIG. 2 is a longitudinal section of FIG. 1.

In FIGS. 1 and 2 showing the thin film magnetic head, reference numerals 15 and 16 refer to lower and upper magnetic cores, respectively; the lower magnetic core 15 being laminated with a magneto-resistive element 14 via an insulating layer. On the top surface of the lower magnetic core 15 provided is a non-magnetic thin film 18 made of alumina, etc., and the ends 151 and 161 of the lower and upper magnetic cores 15 and 16 face each other via the non-magnetic thin film 18, serving as writing magnetic poles for the thin film magnetic head. The lower and upper magnetic cores 15 and 16 constitute a magnetic path. As an exciting coil for the magnetic path a lower-layer thin film coil 41 is provided near the lower magnetic core 15, and an upper-layer thin film coil 42 is provided on the lower-layer thin film core 41; both coils wound in such a manner as to surround the magnetic path. On the extended portion of the non-magnetic thin film 18 between the magnetic poles provided is a first insulating resin layer 21 on which the lower-layer thin film coil 41 is aligned. The lower-layer thin film coil 41 is enclosed by a second insulating resin layer 22. Next, on the top surface of the second insulating resin layer 22 provided is the upper-layer thin film coil 42. The upper-layer thin film coil 42 is enclosed by a third insulating resin layer 23. The upper magnetic core 16 is provided in such a manner as to cover the non-magnetic thin film 18, the first, second and third insulating resin layers 21, 22 and 23, and the upper- and lower-layers of the thin film coil 41 and 42.

In the thin film magnetic head of this invention, the average crystal grain size of copper constituting the thin film coil 41 and 42 is not more than 0.5 $\mu$m, or more preferably not more than 0.2 $\mu$m. As the average crystal grain size of copper is made to be so fine, the specific resistance of the thin film coil can be reduced to not more than 2 $\mu$m-cm, or preferably to not more than 1.8 to 2 $\mu$ohm-cm, quite comparable to the specific resistance of copper in bulk. The surface roughness of the thin film coil can be reduced to not more than 15 nm, and as a result, there is less possibility of short-circuiting even when the thin film coil conductors are aligned in very close intervals. The average crystal grain size of copper is measured in the following manner: The microstructure of copper coil is observed with a microscope and photographed, and the number of crystals in a given length is counted, and the average crystal grain size is obtained by dividing the length by the number of crystals.

The thin film coil used in the thin film magnetic head of this invention is manufactured using a usual lithography technology. In order to form the lower-layer thin film coil 41 on the first insulating resin layer 21 by plating, an electrically conductive film is formed by sputtering an electrically conductive material, such as copper. A photoresist film is applied to the surface of the electrically conductive film and baked at a predetermined temperature. A photomask is positioned on the photoresist film, which is then light-exposed, developed and rinsed with water. This results in a photoresist pattern corresponding to the shape of the lower-layer thin film coil 41. Next, the thin film coil 41 is formed by plating using a plating solution, such as copper sulfate solution. Using as the plating solution, an aqueous solution, including for example

| | |
|---|---|
| Copper sulfate pentahydrate (CuSO$_4$.5H$_2$O) | 40 to 80 g/l |
| Sulfuric acid | 30 to 150 ml/l |
| Hydrochloric acid | 40 to 80 ppm, | to which an appropriate amount of brightener is added, a thin film coil of 3 to 4 $\mu$m in copper film thickness is obtained by plating for 5 to 10 minutes at a plating solution temperature of 20 to 30° C. and current density of 15 to 30 mA/cm$^2$.

The average crystal grain size of copper constituting the thin film coil can be made as fine as in this invention by adjusting current density during plating, the amount of addition of sulfuric acid to the plating solution, and the amount of addition of brightener.

Next, the lower-layer thin film coil 41 can be obtained by dissolving the photoresist film and then removing the electrically conductive film between the thin film coil 41 by ion milling. A photoresist is packed on the lower-layer thin film coil 41 in such a manner as to enclose the coil 41, and then the photoresist is heated and cured at a temperature of about 270° C. to form the second insulating resin layer 22. By repeating the aforementioned process on the second insulating resin layer 22, the upper-layer thin film coil 42 and the third insulating resin layer 23 are formed.

EXPERIMENT 1

Thin film coil was prepared by varying the size of copper crystal grain constituting the coil. Plating conditions are changed by changing the amount of additions to a plating solution mainly consisting of 75 g/l of copper sulfate pentahydrate, 120 ml/l of sulfuric acid, 60 ppm of hydrochloric acid, and 1 ml/l of EBARA-UDYLITE's brightener, Cu-BRITE, changing current density in the range of 10 to 40 mA/cm$^2$, and changing plating time so that the thickness of copper becomes 3 $\mu$m at a plating solution temperature of 25° C. At a current density of 20 mA/cm$^2$, for example, plating time was 7.1 minutes.

Figure 3:
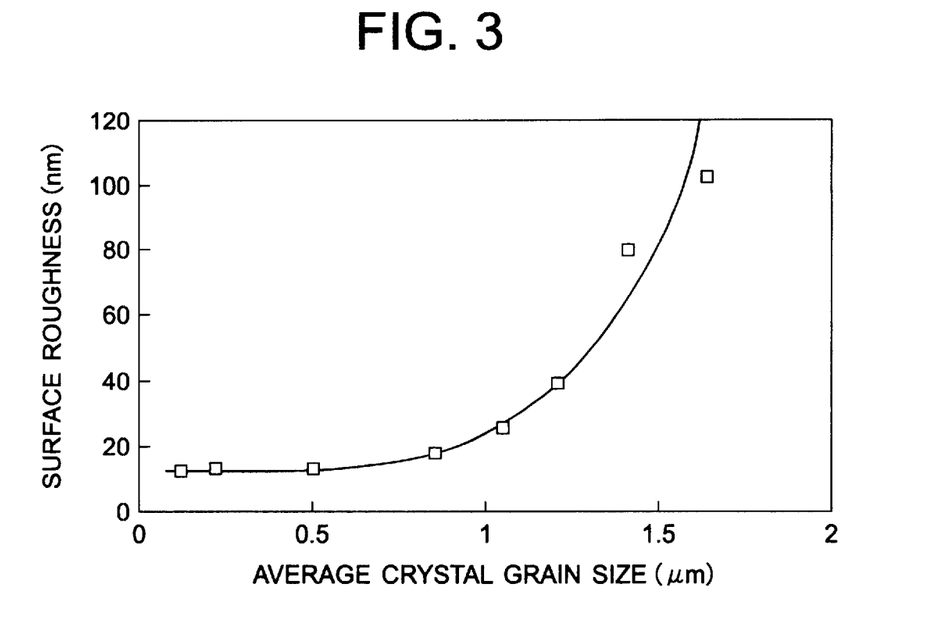
FIG. 3 is a graph illustrating the relationship between the average crystal grain size ($\mu$m) of the thin film copper coil in the thin film magnetic head according to this invention, and the surface roughness (nm) of the thin film coil.

The relationship between the average crystal grain size ($\mu$m) of copper in the thin film coil thus obtained and the surface roughness thereof (nm) is shown in FIG. 3. With increases in the average crystal grain size, the surface roughness increases. The figure reveals that when the average crystal grain size is 1.1 to 1.5 $\mu$m, as in the prior art, the surface roughness becomes 30 to 90 nm, indicating that there is an increasing danger of short-circuiting between the thin film coil conductors, and that when the crystal grain size is not more than 0.5 $\mu$m, the surface roughness becomes not more than 15 nm.

Figure 4:
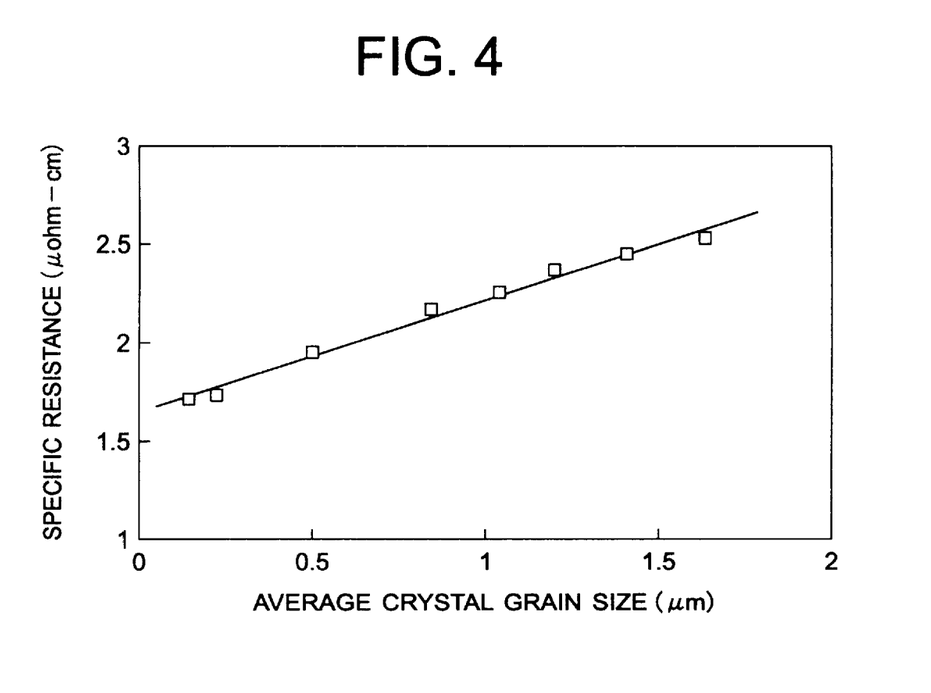
FIG. 4 is a graph illustrating the relationship between the average crystal grain size of the thin film copper coil in the thin film magnetic head according to this invention and the specific resistance ($\mu$ohm-cm) of the thin film coil.

FIG. 4 shows the measurement results of the specific resistance of the thin film coil when the average crystal grain size of copper was varied from 0.15 $\mu$m through 1.7 $\mu$m, as in FIG. 3. As is apparent from FIG. 4, when the average crystal grain size is 1.1 to 1.5 nm, the specific resistance becomes 2.3 to 2.5 μohm-cm. Even when the average crystal grain size is 1.0 μm, the specific resistance is about 2.2 μohm-cm, representing an about 28% increase compared with the corresponding value of 1.724 μohm-cm for copper in bulk. By contrast, when the crystal grain size is not more than 0.5 μm, the specific resistance is less than 2 μohm-cm. When the crystal grain size is 0.2 μm, the specific resistance becomes about 1.75 μohm-cm, approaching the specific resistance value for copper in bulk.

Figure 5:
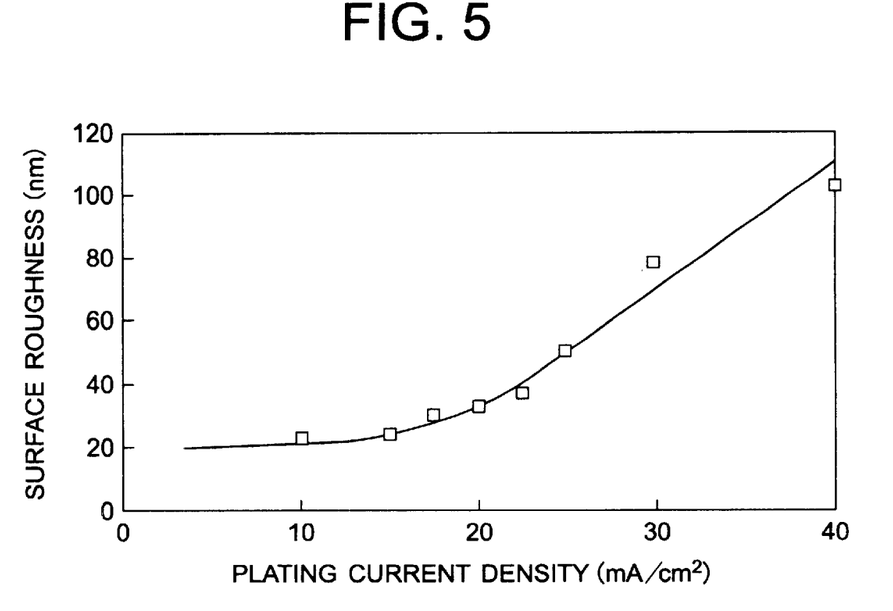
FIGS. 5, 6 and 7 are graphs illustrating the relationship between plating current density (mA/cm$^2$) and the surface roughness (nm) of the thin film coil, between the amount of sulfuric acid (ml/l) in the plating solution and the surface roughness of the thin film coil, and between the amount of addition of brightener (ml/l) in the plating solution and the surface roughness of the thin film coil, respectively.
Figure 6:
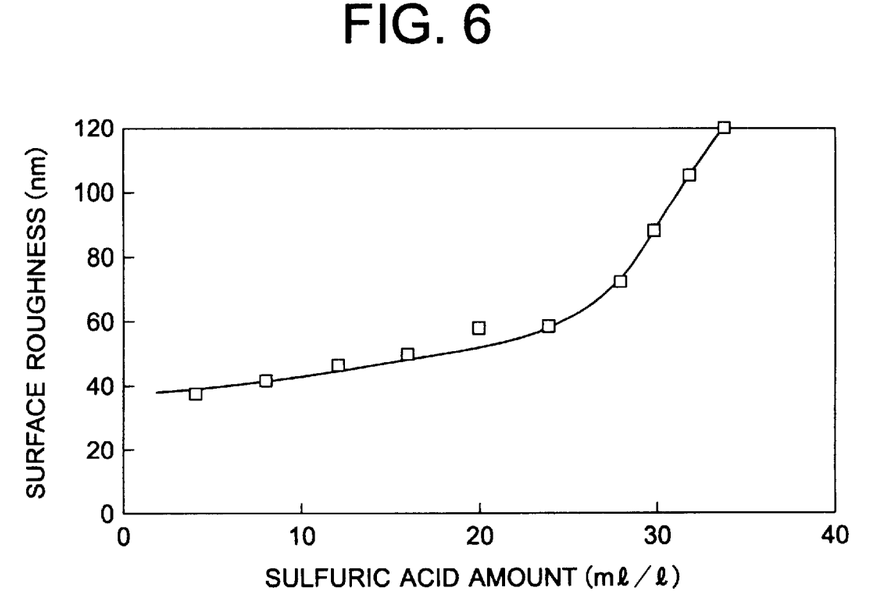
Figure 7:
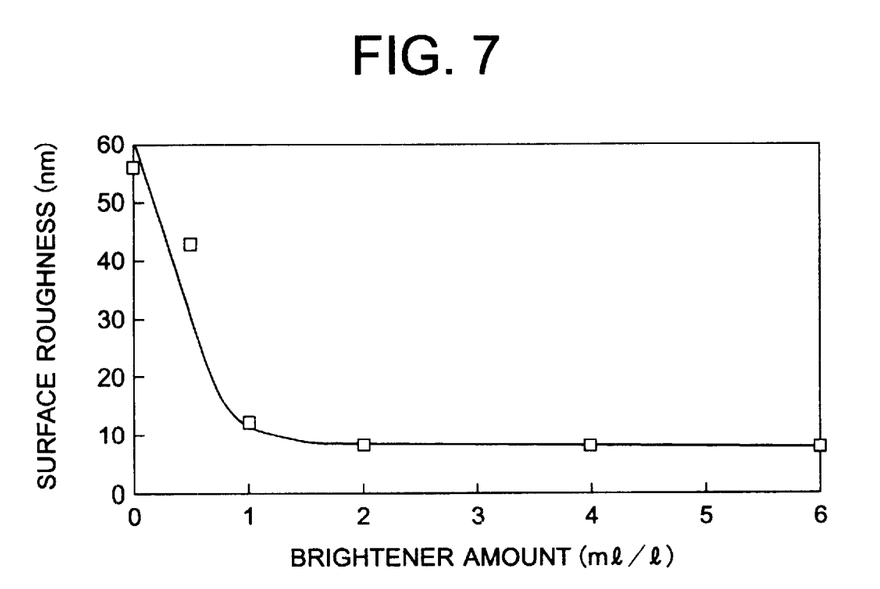

FIGS. 5, 6 and 7 show how the surface roughness varies with changes in plating current density, the amount of addition of sulfuric acid to the plating solution, and the amount of addition of brightener to the plating solution, respectively. It would be understood that since the surface roughness is unilaterally determined by the average crystal grain size as shown in FIG. 3, the average crystal grain size of copper can be changed by changing plating current density, the amount of addition of copper sulfate, the amount of addition of brightener. It would be apparent from these results that it is possible to manufacture thin film coil having fine crystal grains, as with the thin film magnetic head according to this invention.

EXPERIMENT 2

Using the plating solution having main compositions used in EXPERIMENT 1, 5000 pieces of thin film magnetic heads comprising thin film coil with a plating width of 2.5 μm, a coil pitch of 4.5 μm, a coil thickness of 3 μm and 15 turns of windings were manufactured.

The thin film coil thus manufactured had the average crystal grain size of not more than 0.2 μm and the surface roughness of not more than 15 nm. No product defects due to coil layer short-circuiting or penetration of plated film between the electrically conductive film and the resist were found.

EXPERIMENT 3

Thin film magnetic heads were manufactured in the same manner as with EXPERIMENT 2, using the same plating solution used in EXPERIMENT 2 except that the amount of brightener was reduced to 0.5 ml/l.

The average crystal grain size of the thin film coil manufactured was 1.3 μm, and their surface roughness was 43 nm. Product defects due to coil layer short-circuiting were found in 283 pieces out of the total 5000 (5.66%), and defects of penetration of plating film between the electrically conductive film and the resist were found in 98 pieces (1.96%).

In the thin film magnetic head according to this invention, where the average crystal grain size of thin film copper coil is made finer, it is made possible to obtain a specific resistance value of not more than 2 μohm-cm, or more preferably not more than 1.8 μohm-cm, quite comparable to the specific resistance of copper in bulk. The surface roughness of thin film coil can be reduced to not more than 15 nm, and the possibility of short-circuiting can also be reduced even when the thin film coil conductors are aligned adjoining each other at close intervals. As a result, the time constant of the thin film magnetic head can be reduced. This makes it possible to write information at higher frequencies.

What is claimed is:

1. A manufacturing method for a thin film copper coil wound between magnetic poles of lower and upper magnetic cores in a thin film magnetic head, comprising:

sputtering an electrically conductive material on an insulating resin layer formed on a magnetic core, and forming a photoresist pattern corresponding to a shape of a thin film copper coil being plated on the electrically conductive material and electroplating a thin film copper coil of an average crystal grain size not more than 0.5 μm on the electrically conductive material by adjusting current density of the electroplating and an amount of sulfuric acid and brightener in an electroplating solution.

2. A manufacturing method as set forth in claim 1, wherein the average crystal grain size of the thin film copper coil is not more than 0.2 μm.

3. A manufacturing method as set forth in claim 2, wherein the surface roughness of the thin film copper coil is not more than 15 nm.

4. A manufacturing method as set forth in claim 1, wherein the surface roughness of the thin film copper coil is not more than 15 nm.

5. A manufacturing method as set forth in claim 1, wherein intervals between the thin film copper coil and another thin film copper coil are 2 μm to 4 μm.

6. A manufacturing method as set forth in claim 5, wherein the average crystal grain size of said thin film copper coil is not more than 0.2 μm.

7. A manufacturing method for a thin film copper coil wound between magnetic poles of lower and upper magnetic cores in a thin film magnetic head, comprising:

sputtering an electrically conductive material on an insulating resin layer formed on a magnetic core, and forming a photoresist pattern corresponding to a shape of a thin film copper coil being plated on the electrically conductive material and electroplating a thin film copper coil of the thickness of 2.5 μm to 4 μm and of an average crystal grain size not more than 0.5 μm on the electrically conductive material by adjusting current density of the electroplating and an amount of sulfuric acid and brightener in an electroplating solution.

8. A manufacturing method as set forth in claim 7, wherein the average crystal grain size of the thin film copper coil is not more than 0.2 μm.

9. A manufacturing method as set forth in claim 7, wherein the thickness of said thin film copper coil is 3 μm to 4 μm.

10. A manufacturing method as set forth in claim 7, wherein the average crystal grain size of said thin film copper coil is not more than 0.2 μm.

* * * * *

UNITED STATES PATENT AND TRADEMARK OFFICE
CERTIFICATE OF CORRECTION

PATENT NO. : 6,365,029 B1
DATED : April 2, 2002
INVENTOR(S) : Kiyoharu Fujita et al.

It is certified that error appears in the above-identified patent and that said Letters Patent is hereby corrected as shown below:

<u>Column 6,</u>
Line 54, change "claim 7" to -- claim 9 --.

Signed and Sealed this

Twenty-second Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,365,029 B1
DATED : April 2, 2002
INVENTOR(S) : Kiyoharu Fujita et al.

It is certified that error appears in the above-identified patent and that said Letters Patent is hereby corrected as shown below:

<u>Column 6,</u>
Line 54, change "claim 7" to -- claim 9 --.

Signed and Sealed this

Twenty-ninth Day of October, 2002

Attest:

JAMES E. ROGAN
Attesting Officer
Director of the United States Patent and Trademark Office